(12) United States Patent
Tsirkin et al.

(10) Patent No.: US 9,952,890 B2
(45) Date of Patent: Apr. 24, 2018

(54) KERNEL STATE DATA COLLECTION IN A PROTECTED KERNEL ENVIRONMENT

(71) Applicant: Red Hat Israel, Ltd., Raanana (IL)

(72) Inventors: Michael Tsirkin, Raanana (IL); Paolo Bonzini, Milan (IT)

(73) Assignee: RED HAT ISRAEL, LTD., Raanana (IL)

( * ) Notice: Subject to any disclaimer, the term of this patent is extended or adjusted under 35 U.S.C. 154(b) by 79 days.

(21) Appl. No.: 15/055,994

(22) Filed: Feb. 29, 2016

(65) Prior Publication Data

US 2017/0249178 A1  Aug. 31, 2017

(51) Int. Cl.
G06F 9/455 (2006.01)
G06F 11/36 (2006.01)

(52) U.S. Cl.
CPC ........ *G06F 9/45558* (2013.01); *G06F 11/362* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,594,139 B2 * | 9/2009 | Nellitheertha | ...... | G06F 11/1441 714/20 |
| 7,774,636 B2 * | 8/2010 | Rao | ....................... | G06F 11/203 714/15 |
| 7,797,507 B2 * | 9/2010 | Tago | ...................... | G06F 9/5016 711/147 |
| 7,818,616 B2 * | 10/2010 | Kathail | ............... | G06F 11/0778 713/1 |
| 8,307,169 B2 * | 11/2012 | Elteto | ................. | G06F 9/45558 711/152 |
| 8,341,369 B2 * | 12/2012 | Savagaonkar | ........ | G06F 12/145 711/154 |
| 8,359,422 B2 * | 1/2013 | Ali | ........................ | G06F 9/455 711/159 |

(Continued)

OTHER PUBLICATIONS

"Kexec and Kdump for Xen" http://xenbits.xen.org/docs/4.3-testing/misc/kexec_and_kdump.txt, accessed Dec. 24, 2015, 4 pages.

(Continued)

*Primary Examiner* — Mehran Kamran
(74) *Attorney, Agent, or Firm* — Haynes & Boone LLP

(57) ABSTRACT

Methods, systems, and computer program products are included for collecting kernel data in a protected kernel environment. A method includes allocating a first portion of a memory for a first kernel and reserving a second portion of the memory for a second kernel. The second kernel is stored in the second portion of the memory. A hypervisor is provided a memory address corresponding to the second portion of the memory. The hypervisor disables write and execute access privileges corresponding to the second portion of the memory. After a crash occurs corresponding to the first kernel, the second kernel is attempted to be executed. The hypervisor detects the attempted execution of the second kernel. The hypervisor enables execute access privileges corresponding to the second portion of the memory. After the execute access privileges are enabled, the second kernel is executed to collect data corresponding to the first kernel.

20 Claims, 4 Drawing Sheets

(56) References Cited

U.S. PATENT DOCUMENTS

| | | | | |
|---|---|---|---|---|
| 8,719,559 | B2* | 5/2014 | Aloni | G06F 8/67 |
| | | | | 713/2 |
| 8,745,308 | B2* | 6/2014 | Chen | G06F 12/145 |
| | | | | 711/150 |
| 8,862,930 | B2* | 10/2014 | Horman | G06F 11/1415 |
| | | | | 711/150 |
| 9,015,704 | B2* | 4/2015 | Vandegrift | G06F 9/445 |
| | | | | 718/1 |
| 9,043,656 | B2* | 5/2015 | Akirav | G06F 11/1612 |
| | | | | 714/45 |
| 9,292,332 | B1* | 3/2016 | Liguori | G06F 8/65 |
| 2008/0082808 | A1* | 4/2008 | Rothman | G06F 9/4401 |
| | | | | 713/1 |
| 2009/0113109 | A1* | 4/2009 | Nelson | G06F 11/203 |
| | | | | 711/6 |
| 2011/0055829 | A1* | 3/2011 | Dake | G06F 9/546 |
| | | | | 718/1 |
| 2011/0167422 | A1* | 7/2011 | Eom | G06F 9/45558 |
| | | | | 718/1 |
| 2011/0225458 | A1* | 9/2011 | Zuo | G06F 11/362 |
| | | | | 714/37 |
| 2011/0246986 | A1* | 10/2011 | Nicholas | G06F 11/0712 |
| | | | | 718/1 |
| 2012/0096251 | A1* | 4/2012 | Aloni | G06F 9/4401 |
| | | | | 713/2 |
| 2012/0131380 | A1* | 5/2012 | Horman | G06F 11/1415 |
| | | | | 714/6.1 |
| 2013/0097355 | A1* | 4/2013 | Dang | G06F 21/55 |
| | | | | 711/6 |
| 2013/0097356 | A1* | 4/2013 | Dang | G06F 9/455 |
| | | | | 711/6 |
| 2013/0191924 | A1* | 7/2013 | Tedesco | G06F 21/00 |
| | | | | 726/26 |
| 2014/0013327 | A1* | 1/2014 | Sherwood | G06F 9/45533 |
| | | | | 718/1 |
| 2014/0053272 | A1* | 2/2014 | Lukacs | G06F 21/53 |
| | | | | 726/24 |
| 2014/0129875 | A1* | 5/2014 | Zhou | G06F 11/1471 |
| | | | | 714/20 |
| 2014/0149799 | A1* | 5/2014 | Buendgen | G06F 11/0778 |
| | | | | 714/38.11 |
| 2014/0164718 | A1* | 6/2014 | van Schaik | G06F 12/1441 |
| | | | | 711/150 |
| 2014/0281460 | A1* | 9/2014 | Friedman | G06F 11/1417 |
| | | | | 713/2 |
| 2015/0317178 | A1* | 11/2015 | Dang | G06F 9/455 |
| | | | | 718/1 |
| 2016/0034294 | A1* | 2/2016 | Christenson | G06F 9/45558 |
| | | | | 718/1 |
| 2016/0055018 | A1* | 2/2016 | Usgaonkar | G06F 9/45558 |
| | | | | 718/1 |
| 2016/0246961 | A1* | 8/2016 | Wang | G06F 12/084 |
| 2017/0032119 | A1* | 2/2017 | Dore | G06F 21/53 |

OTHER PUBLICATIONS

Gavin Thomas, "Kernel 3.18 Development—The Kernel Column" http://www.linuxuser.co.uk/news/kernel-3-18-development-the-kernel-column, accessed Dec. 24, 2015, 5 pages.

Vitaly Kuznetsov "PVHVM Linux Guest why doesn't Kexec Work?" http://events.linuxfoundation.org/sites/events/files/slides/seattle2015_xen.pdf, Red Hat Xen Developer Summit, 2015, 18 pages.

Xensummit, "kexec / kdump Implementation in Linux Kernel and Xen Hypervisor" http://www.slideshare.net/xen_com_mgr/7-daniel-kkexeckdump, Santa Clara, California, Aug. 2-3, 2011, 18 pages.

* cited by examiner

KERNEL STATE DATA COLLECTION IN A PROTECTED KERNEL ENVIRONMENT

FIELD OF DISCLOSURE

The present disclosure generally relates to memory, and more particularly to systems and methods for performing data collection corresponding to a state of a kernel.

BACKGROUND

Conventional technologies that are provided at the kernel level include kernel protection mechanisms. Kernel protection mechanisms allow enforcement of kernel protection measures that prevent portions of the kernel from being executed and/or modified. These mechanisms are useful for thwarting at least some malware and helping to safeguard the integrity of the kernel.

One issue that has arisen is that these kernel protection mechanisms are not compatible with other technologies that require write and/or execute access to the kernel. That is, the kernel protection mechanisms may render other technologies inoperable. For example, the kernel protection mechanisms may prevent particular features from being executed. These issues may result in the kernel protection mechanisms being impractical for use in production environments.

Accordingly, while kernel protection mechanisms may be helpful in some ways, they may also counter useful features that allow users to perform beneficial activities, such as by preventing collection of kernel data responsive to a kernel crash. It would be advantageous to allow the kernel data to be collected, while at the same time allowing kernel protection mechanisms to be implemented. The techniques provided herein offer kernel data collection features in a protected kernel environment.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
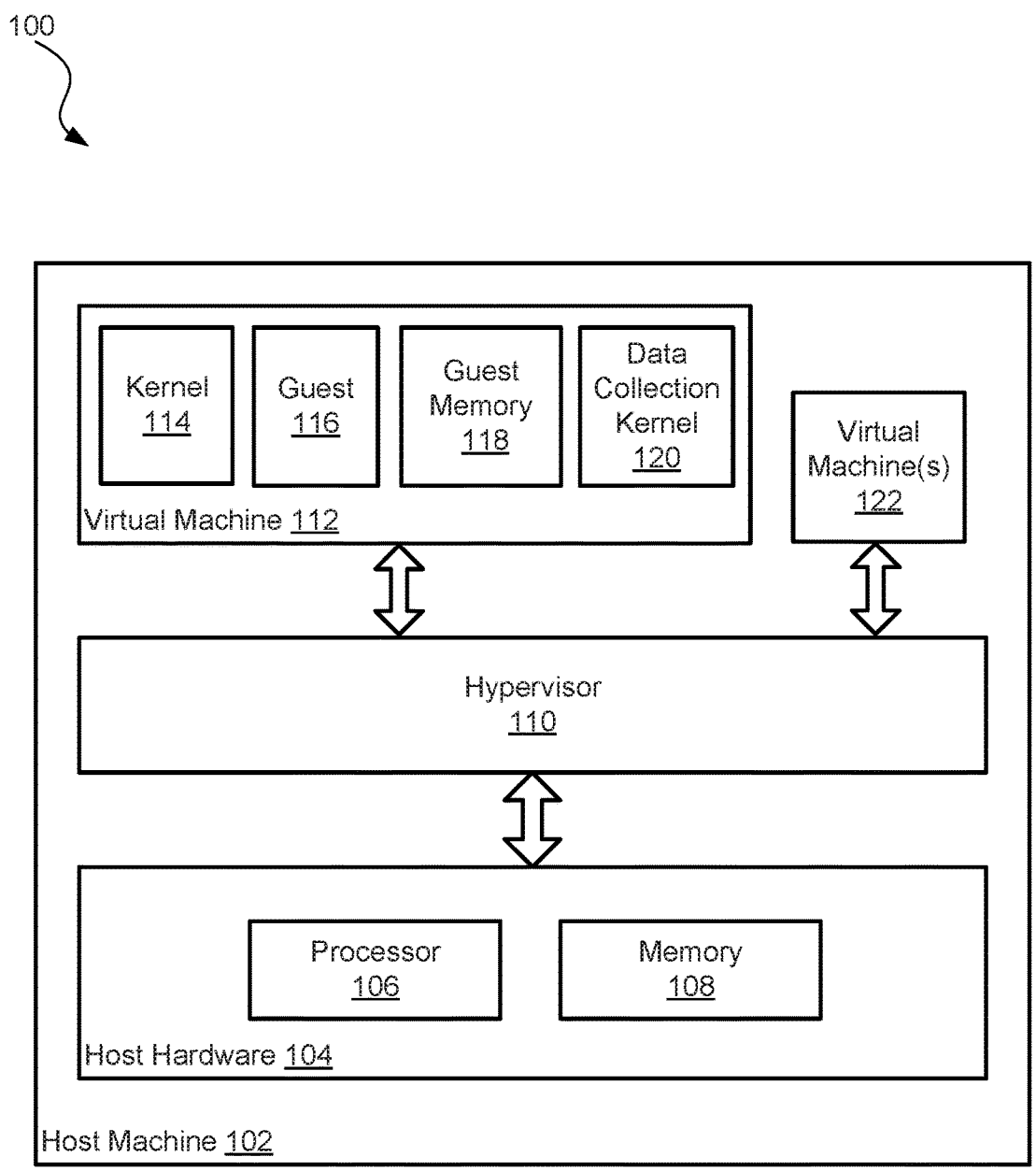
FIG. 1 is an organizational diagram illustrating a system that provides a protected kernel environment, in accordance with various examples of the present disclosure.

FIG. 1 is an organizational diagram illustrating a system that provides a protected kernel environment, in which various aspects of the present disclosure may be implemented.

The system 100 includes a host machine 102. The host machine 102 includes host hardware 104. Host hardware 104 includes physical elements such as a processor 106, memory 108, and may also include other input/output (I/O) devices, such as those illustrated in FIG. 4.

The host machine 102 includes a hypervisor 110, which also may be referred to as a virtual machine monitor. Hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

In the present example, hypervisor 110 provides one or more virtual machines, such as the virtual machine 112 and virtual machine(s) 122. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including providing access of virtual machines (e.g., virtual machine 112 and virtual machine(s) 122) to the host hardware 104, such as processor 106, memory 108, and other hardware devices. In some examples, the system resources that may be provided to each virtual machine include a virtual CPU that is mapped to the processor 106, guest memory that is mapped to a portion of the memory 108, one or more virtual devices that are mapped to other host hardware 104, such as a network device, an emulated NIC or disk, virtual firmware, and so forth.

In the present example, a kernel 114 runs on the virtual machine 112 provided by the hypervisor 110. The kernel 114 provides core computing functionality to the virtual machine 112. For example, kernel 114 is structured to manage important tasks, such as allocating guest memory 118, sending and receiving I/O, managing a file system provided to the guest 116, handling interrupts, scheduling and running processes to execute instructions of computing tasks, providing an interface between devices and software applications, and/or providing other fundamental computing features.

In the present example, the virtual machine 112 includes a data collection kernel 120. The data collection kernel 120 is structured as a kernel that is activated in the event of a crash of kernel 114. A crash may include any kernel disruption, such as a kernel panic, hardware failure, a fault from which the kernel cannot recover, a hang/lockup, an overflow of kernel memory, and so forth. A crash may also be triggered by a guest administrator request. In the event of a crash corresponding to kernel 114, the data collection kernel 120 is structured to read portions of the guest memory 118 corresponding to the kernel 114 and/or other portions of the guest memory 118 to collect data and store the collected data. In some examples, the data may be stored in a portion of the guest memory 118 and/or a data partition that is reserved for storing the collected data. The collecting and storing of the collected data may also be referred to as performing a kernel dump. In some examples, the data collection kernel 120 is structured to execute a program such as KDUMP.

In the present example, the virtual machine 112 is structured with a guest 116 that is built on top of the kernel 114 and relies upon the kernel 114 for allocating portions of the guest memory 118 to the guest 116 (and its applications) and executing instructions of the guest 116 (and its applications). The guest 116 may also be referred to as a guest operating system. Examples of guests include, for example, LINUX, UNIX, DOS, OS/2, IOS, ANDROID, WINDOWS, and so forth. These guests all include, at their core, a kernel (such as kernel 114) that handles allocation of memory and runs processes to execute instructions. The guest 116 may include features such as user interfaces (such as desktop and/or command line interfaces), file systems, server applications, database management systems, and various other user applications that may be pre-installed on the guest 116 or added after installation of the guest 116.

Each virtual machine 122 may be similarly structured with a guest operating system built on top of a kernel, and a guest memory that may have portions allocated to the kernel, the guest operation system, and/or other applications.

The host machine 102 may execute a host operating system. The guest 116 running on a virtual machine 112 may include a same or a different operating system as a host operating system running on the host machine 102. For example, the guest 116 may provide an operating system that is accessed locally on the host machine 102 as a default operating environment of the host machine 102. In other examples, the host machine 102 is structured with an operating system that is separate from the guest 116, and the guest 116 is provided in addition to the host machine's operating system. Accordingly, the host machine 102 may run multiple operating systems concurrently and in isolation from other operating systems. Moreover, the guest operating systems of the host machine 102, virtual machine 112 and virtual machine(s) 112 may be homogenous or heterogeneous. That is, the guest operating systems may all be one type (e.g., LINUX) or may be different types (e.g., guest 116 may be RED HAT ENTERPRISE LINUX, and a virtual machine of the virtual machine(s) may include a guest that is provided by a non-LINUX vendor).

The hypervisor 110 provides a guest memory 118 that is allocated to the kernel 114, guest 116, data collection kernel 120 and/or other applications running on the virtual machine 112. In the present example, the guest memory 118 is structured as a virtualized portion of the memory 108. The guest memory 118 may include one or more guest memory pages that are mapped to memory pages of the memory 108 via one or more mappings, such as page tables. The mapping(s) may be provided by the hypervisor 110. In some examples, the page tables are host page tables, which may include, for example, Extended Page Tables (EPT), shadow page tables, or hypervisor page tables. Accordingly, the hypervisor 110 is structured with access to the guest memory 118 to virtualize the memory 108 and provide the guest memory 118 to the virtual machine 112.

Further, the hypervisor 110 may also virtualize other areas of memory 108 for the virtual machines(s) 122 that are not included in the guest memory 116. These other areas of memory may therefore be inaccessible to the kernel 114 and/or guest 116. For example, the hypervisor 110 may also be structured to provide other guest memories to each of the virtual machine(s) 122 that are isolated from other guest memories. Accordingly, the hypervisor 110 is structured with access to the memory 108 to allocate and provide guest memory (e.g., guest memory 118 and/or other guest memories provided to the virtual machine(s) 122).

The guest memory 118 and/or memory 108 may be structured to implement various access privileges (e.g., read access, write access, and/or execute access) that may be enabled and/or disabled via one or more flags or other data structures that are maintained corresponding to the memory pages and/or page mappings. For example, page tables may be accessed by the hypervisor 110 to enable/add and/or disable/remove access privileges corresponding to the memory pages in the guest memory. For example, the page tables may include a page table entry corresponding to each memory page in the guest memory 118. Each page table entry may include values that may be modified to enable and/or disable access privileges of the kernel 114, guest 116, data collection kernel 120, and other programs running on the virtual machine 112. The hypervisor 110 may modify the access privileges to allow or prohibit particular access types (e.g., read, write, and/or execute access) for particular memory pages and memory addresses of the guest memory 118.

In the present example, the virtual machine 112 is structured to provide a protected kernel environment, which may prevent read, write, and/or execute access to portions of the guest memory 118, such as portions of the guest memory that are allocated to the kernel 114 and/or the data collection kernel 120. For example, the virtual machine 112 may be structured to include KERNEL GUARD TECHNOLOGY (KGT), which protects memory pages and/or page entries corresponding to the kernel 114 and/or data collection kernel 120 from being written to and/or executed. In some examples, the protected kernel environment uses the hypervisor 110 to modify access privileges for the portions of the guest memory 118. For example, the protected kernel environment may be provided by the hypervisor 110 removing/ disabling write and/or execute access privileges to portions of the guest memory 118 that are allocated for use by the kernel 114 and/or data collection kernel 120. In some examples, activation of the protected kernel environment is triggered by the kernel 114 executing a hypercall to request that the hypervisor 110 disable/remove access permissions to particular portions of the guest memory 116.

In the present example, the hypervisor 110 is structured with access to the guest memory 118, including page table entries and memory pages allocated to the kernel 114 and the data collection kernel 120. The hypervisor 110 is structured to maintain this access even while the protected kernel environment is implemented, so that the hypervisor 110 may modify access privileges and otherwise manage and control the execution of the virtual machine 112.

Figure 2:
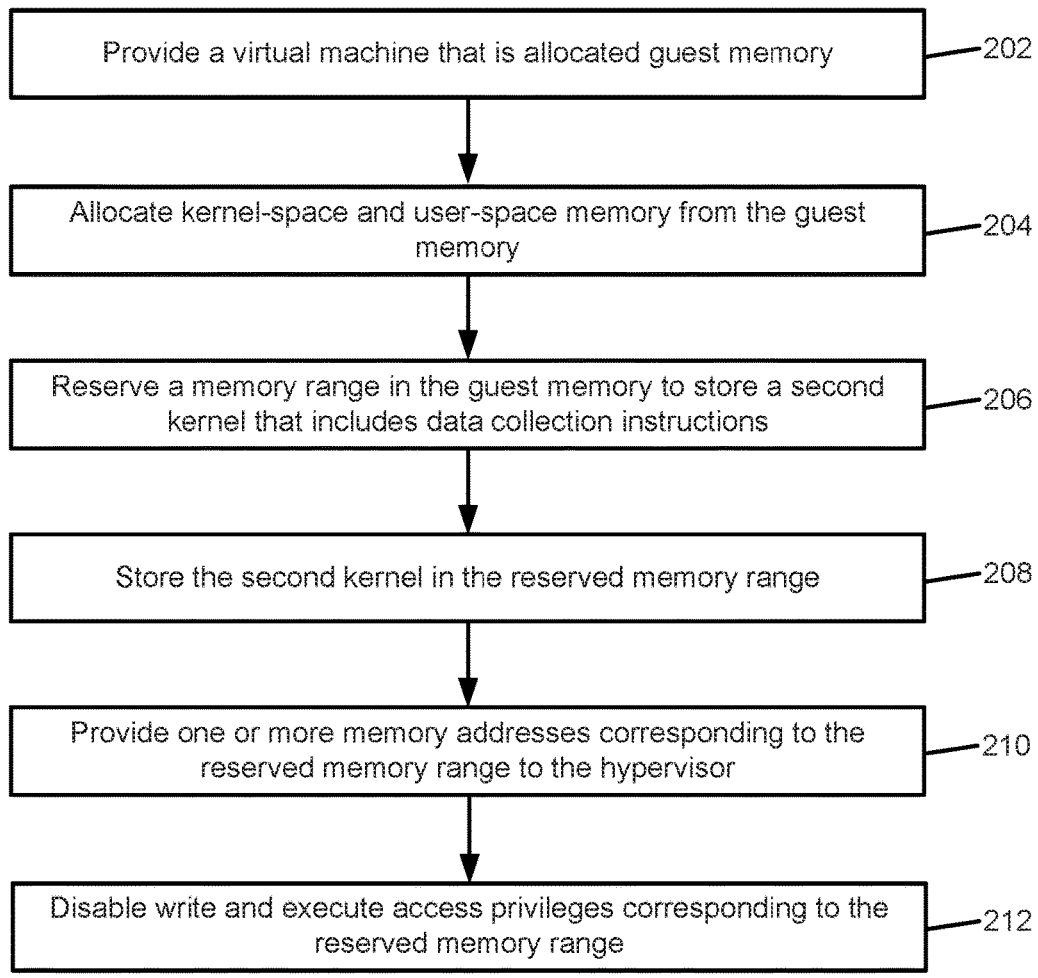
FIG. 2 is a flow diagram illustrating providing of a kernel data collection feature in a protected kernel environment, in accordance with various examples of the present disclosure.

FIG. 2 is a flow diagram illustrating providing of a kernel data collection feature in a protected kernel environment, according to some examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 202, the hypervisor is executed to run a virtual machine. The hypervisor allocates a portion of a host memory for use by the virtual machine. This allocated portion may include one or more contiguous and/or non-contiguous ranges of memory addresses from the host memory. In some examples, the portion of the host memory that is allocated to the virtual machine is referred to as a guest memory. In some examples, the allocating includes creating and/or modifying one or more page entries by the hypervisor to map memory addresses of the host memory to memory addresses of the guest memory.

At action 204, a kernel is executed on the virtual machine to allocate portions of the guest memory for use by the kernel and for use by other programs, such as a guest operating system and/or other user programs. In some examples, the portion of the guest memory allocated to the kernel is referred to as kernel-space, and the portion of the guest memory allocated to the guest operating system and other programs is referred to as user-space. The portions allocated for kernel-space and user-space may include contiguous and/or non-contiguous memory address ranges from the guest memory.

At action 206, the kernel reserves one or more contiguous and/or non-contiguous memory ranges of the guest memory for storing instructions corresponding to a second kernel that is used to perform data collection in the event of a kernel crash. In some examples, the portion of the guest memory that is reserved for the second kernel is allocated from the kernel-space portion of the guest memory that was allocated for use by the kernel. Thus, a second portion of memory is included in a first portion of memory.

At action 208, the kernel stores the second kernel in the reserved memory range.

At action 210, the kernel provides one or more memory addresses corresponding to the reserved memory range to the hypervisor. For example, a starting memory address and/or offset corresponding to the reserved memory range may be provided to the hypervisor in addition to a size of the reserved memory range. In other examples, addresses of one or more memory pages corresponding to the reserved range may be provided to the hypervisor. In yet other examples, starting and ending memory addresses corresponding to the reserved memory range are provided to the hypervisor.

In the present example, the one or more addresses corresponding to the reserved memory range are provided by the kernel to the hypervisor. The kernel and hypervisor may communicate, for example, via hypercalls, system calls, shared memory, and/or interrupts.

In addition to providing the one or more addresses to the hypervisor, the kernel may store the one or more memory addresses so that these memory addresses may be used to transition execution from the kernel to the second kernel in the event of a kernel crash. For example, the one or more memory addresses may be stored in a portion of the guest memory that may be referred to as a reboot code buffer. The reboot code buffer may be executed in the event of a crash corresponding to the kernel to store at least some data corresponding to the kernel, such as data stored in registers, and then transition execution to the second kernel from the first kernel. Accordingly, the one or more memory addresses may be stored in the reboot code buffer so that the reboot code buffer instructions are able to reference/jump to a location of the second kernel in order to start execution of the second kernel. The instructions in the reboot code buffer that store at least some kernel data and transition execution to the second kernel may be referred to as trampoline code.

At action 212, a kernel protection feature is activated to modify access privileges corresponding to the kernel and/or second kernel. In the present example, the kernel protection feature is provided by the hypervisor to disable/remove write and execute access privileges corresponding to the reserved portion of the guest memory, such that the kernel and/or other programs running on the virtual machine are prevented from writing data to the reserved portion of the guest memory and executing instructions corresponding to the reserved portion of the guest memory that stores the second kernel.

The virtual machine that includes the activated kernel protection feature may be referred to as a protected kernel environment. In some examples, the kernel protection feature is activated by the kernel executing a hypercall that requests that the hypervisor activate the kernel protection feature. The hypervisor may provide the kernel protection feature by performing operations such as modifying one or more page table entries to disable/remove read, write, and/or execute access privileges to portions of the guest memory.

In some examples, the modifying of the page table entries is performed by the hypervisor setting one or more flags or updating one or more variables corresponding to the memory pages of the guest memory to indicate that particular portions of the guest memory are not writable or executable (e.g., that the particular portions are read-only). In some examples, the flag(s) variables may be edited by modifying one or more bits in one or more page table entries of the host page tables.

In the present example, the disabling/removing of write and execute access privileges corresponding to the second kernel prevents writing to or executing the second kernel by any program running on the virtual machine. For example, the kernel, guest operating system running on top of the kernel, and/or other applications on the virtual machine are prevented by the kernel protection feature from executing the second kernel or writing to the reserved memory range allocated to the second kernel. In more detail, regarding the disabling of write privileges, the kernel protection feature may prevent write operations from being executed to modify (1) memory pages that are allocated to the second kernel and/or (2) page mappings (such as page table entries) that correspond to the memory pages that are allocated to the second kernel.

The kernel protection feature described herein is merely one example of an implementation of a kernel protection feature. In other examples, a kernel protection feature may include one or more other kernel protection features similar to and/or different than the kernel protection feature discussed above.

Figure 3:
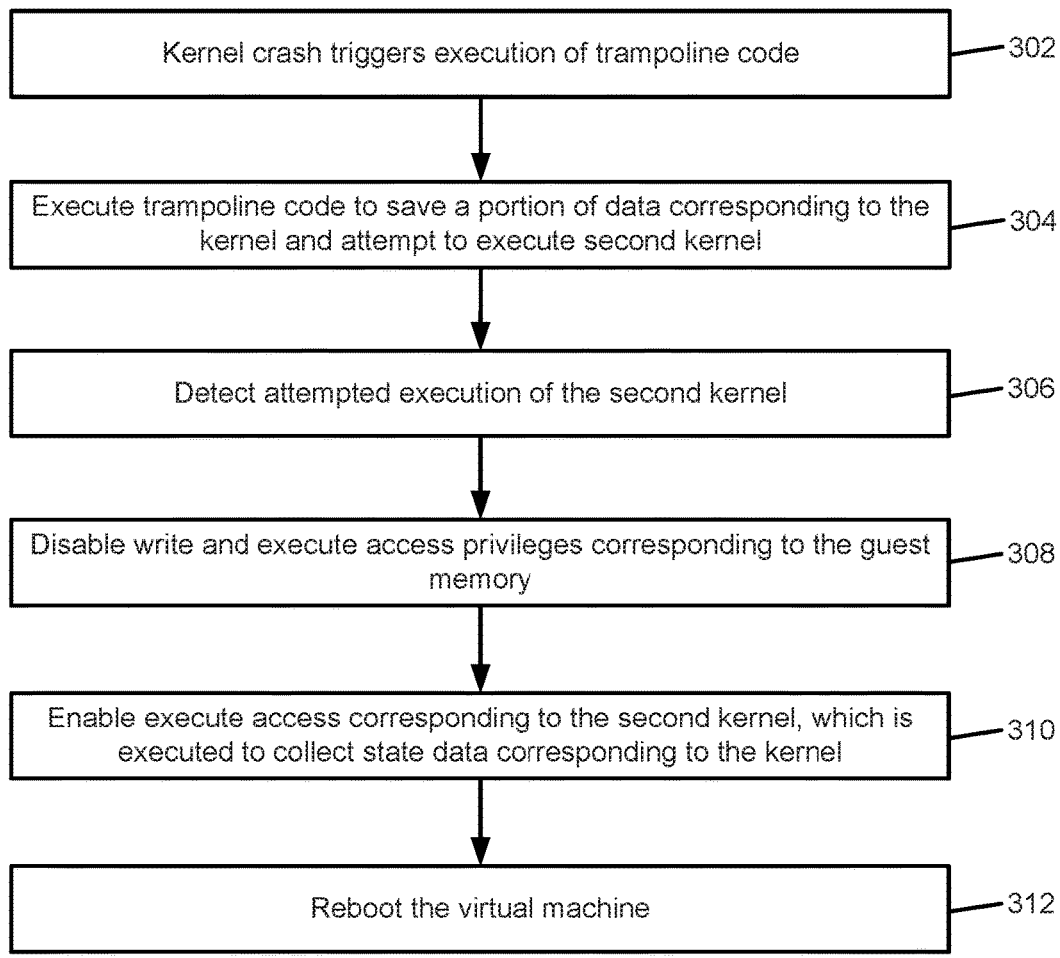
FIG. 3 is a flow diagram illustrating collection of data by a kernel data collection feature in a protected kernel environment, in accordance with various examples of the present disclosure.

FIG. 3 is a flow diagram illustrating collection of data by a kernel data collection feature in a protected kernel environment, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 302, a kernel crash occurs corresponding to a kernel that is running on a virtual machine provided by hypervisor. Responsive to the kernel crash, trampoline code included in a reboot code buffer is executed. In some examples, the reboot code buffer may be included in a portion of the kernel or in another portion of a guest memory.

At action 304, one or more instructions of the trampoline code are executed to attempt to transition execution from the kernel to a second kernel that is stored in a reserved portion of memory. In the present example, the trampoline code attempts to transition execution to the second kernel by loading a memory address corresponding to the second kernel and jumping to the memory address. Accordingly, the trampoline code attempts to transition execution to the second kernel. In other examples, the trampoline code may attempt the transition in other ways.

In some examples, the trampoline code also performs other tasks in addition to attempting to transition execution to the second kernel. For example, the trampoline code may collect data from one or more registers that store data corresponding to the kernel. This data may be collected prior to transitioning to the second kernel to avoid losing the data. For example, data corresponding to the second kernel may be loaded into the registers in order to execute the second kernel. Accordingly, the data from the registers corresponding to the first kernel may be collected and stored by the trampoline code prior to loading the data from the second kernel into the registers.

At action 306, responsive to the attempted execution of the second kernel, a page fault, exception, and/or other error is triggered. In the present example, the instructions of the second kernel are stored in a reserved portion of memory in which write and execute access privileges have been disabled by a kernel protection feature. Accordingly, the attempted execution of the non-executable instructions results in a page fault, which may cause a processor to send an exception. In the present example, the exception includes information corresponding to the page fault, such as the memory address where the page fault occurred.

The hypervisor detects the attempted execution. The attempted execution may be detected in different ways, such as by listening for exceptions generated by a processor or by using a Virtual Machine Exit (VMEXIT). Examples for these detection mechanisms are described in more detail, below.

In some examples, the page fault, exception, and/or other error triggers a handler at the hypervisor, which executes instructions to respond to the page fault, exception, and/or other error. For example, the attempted execution of the one or more instructions may trigger a page fault, based on the one or more instructions being modified to non-executable by the kernel protection feature. The page fault may cause an exception to be generated by the processor. In some examples, the hypervisor may include a handler that listens for the exception and identifies the exception sent from the processor in order to perform operations responsive to the exception. In some examples, the processor locates the handler for the exception using an Interrupt Descriptor Table (IDT). In other examples, responsive to a page fault, the processor switches execution from the guest to the hypervisor using VMEXIT.

In some examples, once the hypervisor is being executed to respond to the page fault, exception, and/or other error, the hypervisor compares a memory address corresponding to the page fault with a memory address corresponding to the reserved memory range where the second kernel is stored. For example, the hypervisor may compare the page fault address with the memory address received at action 210. If the memory addresses are a match, the hypervisor determines that the second kernel was attempted to be executed. Accordingly, the hypervisor detects the attempted execution of the second kernel that is stored in the reserved memory range in the guest memory.

At action 308, after the hypervisor determines that the attempted execution corresponds to the second kernel, the hypervisor removes write and execute access privileges corresponding to portions of the guest memory that are not included in the reserved portion of memory. For example, the hypervisor may modify privileges corresponding to kernel-space and user-space portions of the guest memory so that these portions are read-only. Accordingly, the guest memory corresponding to the virtual machine may be set to be non-writable and non-executable. In more detail, the virtual machine's memory allocated to the kernel, guest operating system, and/or user programs may be set to read-only.

At action 310, the hypervisor enables execution of the reserved portion of the guest memory that is allocated for use by the second kernel. In some examples, the hypervisor modifies the access privileges corresponding to the reserved memory range to allow execution of the instructions of the second kernel. In some examples, the modifying of the access privileges is performed by setting a flag and/or indicator corresponding to the memory addresses of the reserved portion of the memory to indicate that the memory addresses are executable. In some examples, the flag may include one or more bits in entries of page tables, such as the host page tables. Accordingly, instructions of the second kernel that are stored in the reserved portion of guest memory are rendered executable on the virtual machine. The hypervisor may then transfer execution back to the virtual machine, so that the second kernel may be executed on the virtual machine.

In the present example, the second kernel is executed to provide a minimal operating environment, which provides features for collecting data corresponding to the kernel that crashed. The collected data may be referred to as kernel dump data. This collected data may be useful for debugging purposes, to help determine the cause of the crash and potential fixes to prevent future crashes. In the present example, the second kernel may collect the data corresponding to the kernel by reading data from the portion of the guest memory allocated to the kernel. Due to the access privileges of portions of the guest memory being set to read-only, the second kernel may be prevented from writing to the portions of the guest memory and/or executing the portions of the guest memory. Accordingly, the second kernel may be limited to executing its own instructions from the reserved portion of the guest memory and reading other portions of the guest memory.

In some examples, the data corresponding to the kernel is collected by executing instructions of the second kernel to copy portions of the guest memory corresponding to the kernel to a destination. The destination may be a storage partition, which may include one or more files. The storage partition may be configured as a kernel dump partition that is reserved for storing kernel dump data. In some examples, in addition to collecting data corresponding to the kernel, other portions of the guest memory may be collected as well. For example, user-space data may also be collected and stored by the second kernel. The collected data may be referred to as kernel state data because the collected data may be used to analyze and debug the state of the kernel at the time of the kernel crash.

Until a reboot/reset is provided at action 312, any attempts to write to the first kernel or execute instructions corresponding to the first kernel may be denied.

At action 312, after collecting and storing the data, the second kernel triggers a reboot of the virtual machine. During the reboot, the access privileges corresponding to the guest memory are reset to a default configuration, which may enable execution of the kernel on the virtual machine. The collected and stored data may then be accessed by the kernel and/or other programs to perform analysis and/or debugging of the kernel crash. In some examples, the collected data may be transmitted to another machine for analysis and/or debugging.

Figure 4:
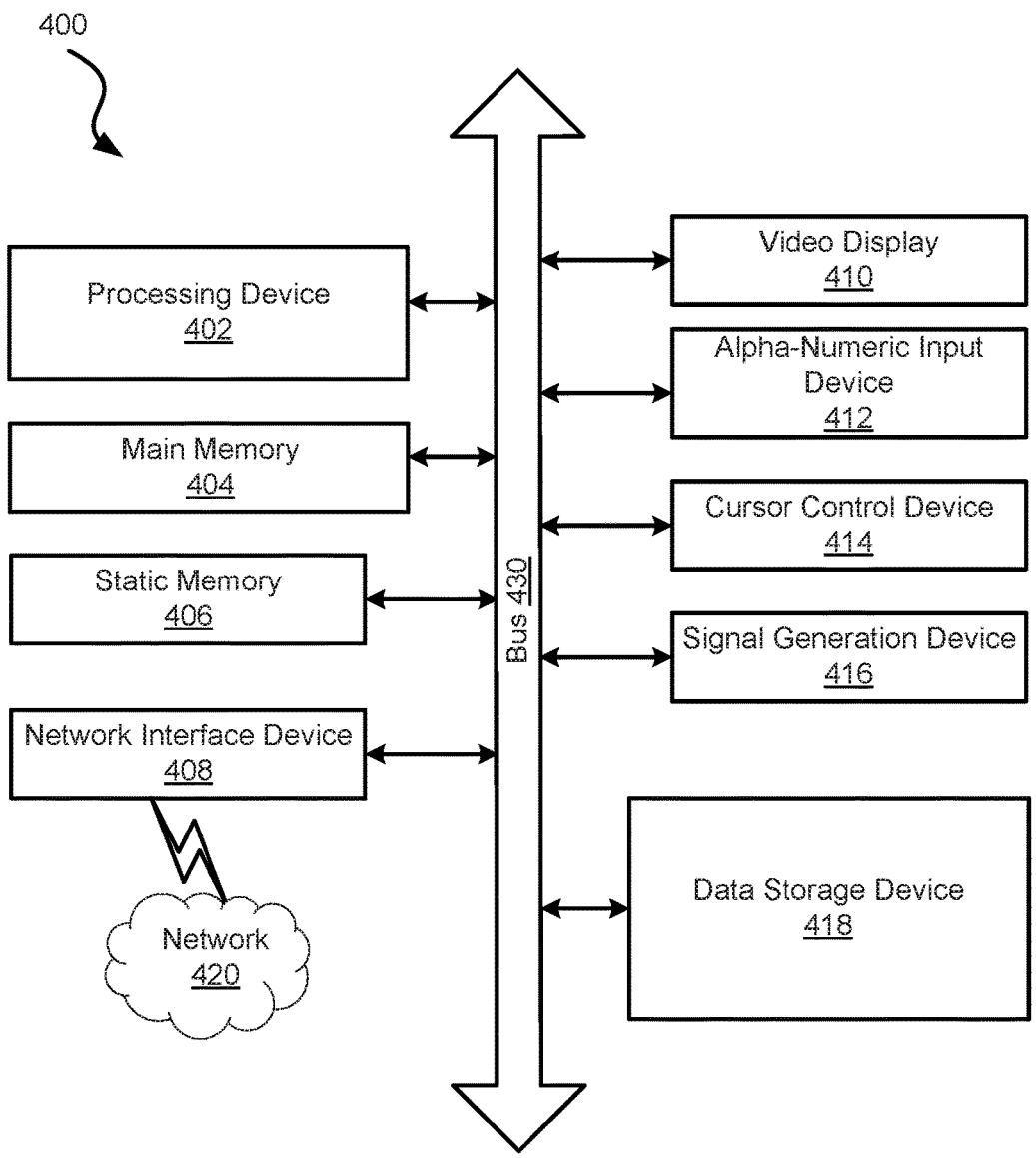
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 122.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for collecting kernel data from a virtual machine, the method comprising:
    allocating a first portion of a memory for a first kernel and reserving a second portion of the memory for a second kernel;
    storing the second kernel in the second portion of the memory;
    providing, to a hypervisor, at least one memory address corresponding to the second portion of the memory;
    disabling, by the hypervisor, write and execute access privileges corresponding to the at least one memory address;
    attempting to execute the second kernel that is stored in the second portion of the memory;
    detecting, by the hypervisor, the attempted execution of the second kernel;
    after the detecting, enabling execute access privileges corresponding to the second portion of the memory;
    after enabling the execute access privileges, executing the second kernel to collect data corresponding to the first kernel, wherein prior to executing the second kernel, the hypervisor disables write and execute access privileges corresponding to the first portion of the memory; and
    after collecting the data corresponding to the first kernel, performing a virtual machine reboot, wherein the virtual machine reboot resets at least one access permission corresponding to the memory and restores operation of the first kernel.

2. The method of claim 1, wherein the disabling of the write and execute access privileges comprises modifying one or more host page table entries to indicate that the second portion of the memory is non-executable and non-writable.

3. The method of claim 1, wherein the second kernel stores the collected data to a storage partition.

4. The method of claim 1, wherein the second portion of memory is included in the first portion of memory.

5. The method of claim 1, further comprising:
    after executing the second kernel, receiving a request to perform a write or execute operating corresponding to the first kernel; and
    denying the request if a reboot has not been performed after executing the second kernel.

6. The method of claim 1, wherein the attempting to execute the second kernel is performed after a crash corresponding to the first kernel, wherein the crash triggers execution of one or more instructions to transition execution from the first kernel to the second kernel, and wherein the one or more instructions are executed to collect data from one or more registers that store data corresponding to the first kernel.

7. The method of claim 1, wherein the enabling of the execute access privileges comprises modifying one or more host page table entries to indicate that the second portion of the memory is executable.

8. The method of claim 1, wherein the attempted execution of the second kernel triggers a page fault, and wherein the detecting of the attempted execution comprises:
    triggering, by the page fault, a virtual machine exit; and
    responsive to the virtual machine exit, performing one or more operations by the hypervisor.

9. The method of claim 1, wherein the attempted execution of the second kernel triggers a page fault that causes a processor to send an exception corresponding to the page fault, and wherein the detecting of the attempted execution comprises:
    listening, by a handler provided by the hypervisor, for the exception; and
    performing, by the handler, one or more operations responsive to the exception.

10. The method of claim 1, wherein prior to executing the second kernel, the hypervisor disables write and execute access privileges corresponding to the first portion of the memory and to a third portion of the memory that is allocated for user programs.

11. The method of claim 1, further comprising, after collecting the data corresponding to the first kernel, performing a virtual machine reboot, wherein the virtual machine reboot resets at least one access permission and restores the first kernel to operation.

12. A non-transitory machine-readable medium having stored thereon machine-readable instructions executable to cause a machine to perform operations comprising:
    allocating a first portion of a memory for a first kernel and reserving a second portion of the memory for a second kernel;
    storing the second kernel in the second portion of the memory;
    providing, to a hypervisor, at least one memory address corresponding to the second portion of the memory;
    disabling, by the hypervisor, write and execute access privileges corresponding to the second portion of the memory;
    attempting to execute the second kernel that is stored in the second portion of the memory;
    detecting, by the hypervisor, the attempted execution of the second kernel;
    enabling, by the hypervisor, execute access privileges corresponding to the second portion of the memory; and
    executing the second kernel to collect data corresponding to the first kernel;
    wherein prior to executing the second kernel, the hypervisor disables write and execute access privileges corresponding to the first portion of the memory and to a third portion of the memory that is allocated for user programs.

13. The non-transitory machine-readable medium of claim 12, wherein the second portion of memory is included in the first portion of memory.

14. The non-transitory machine-readable medium of claim 12, wherein the attempting to execute the second kernel is performed after a crash corresponding to the first kernel, wherein the crash triggers execution of one or more instructions to transition execution from the first kernel to the second kernel, and wherein the one or more instructions are executed to collect data from one or more registers that store data corresponding to the first kernel.

15. The non-transitory machine-readable medium of claim 12, the operations further comprising:
    after collecting the data corresponding to the first kernel, performing a virtual machine reboot, wherein the virtual machine reboot resets at least one access permission and restores the first kernel to operation.

16. A system comprising:
    a non-transitory machine readable medium that includes a first portion of a memory allocated for a first kernel and a second portion of the memory allocated for a second kernel; and
    one or more hardware processors coupled to the non-transitory memory and configured to read instructions from the non-transitory memory to cause the system to perform operations comprising:
    providing, to a hypervisor, at least one memory address corresponding to the second portion of the memory;
    disabling, by the hypervisor, write and execute access privileges corresponding to the second portion of the memory;
    attempting to execute the second kernel that is stored in the second portion of the memory;
    detecting, by the hypervisor, the attempted execution of the second kernel;
    enabling, by the hypervisor, execute access privileges corresponding to the second portion of the memory;
    executing the second kernel to collect data corresponding to the first kernel; and
    after collecting the data corresponding to the first kernel, performing a virtual machine reboot, wherein the virtual machine reboot resets at least one access permission and restores the first kernel to operation.

17. The system of claim 16, wherein the second portion of memory is included in the first portion of memory.

18. The system of claim 16, wherein prior to executing the second kernel, the hypervisor disables write and execute access privileges corresponding to the first portion of the memory and to a third portion of the memory that is allocated for user programs.

19. The system of claim 16, wherein the attempting to execute the second kernel is performed after a crash corresponding to the first kernel, wherein the crash triggers execution of one or more instructions to transition execution from the first kernel to the second kernel, and wherein the one or more instructions are executed to collect data from one or more registers that store data corresponding to the first kernel.

20. The system of claim 16, the operations further comprising, after executing the second kernel, receiving a request to perform a write or execute operating corresponding to the first kernel; and
    denying the request if a reboot has not been performed after executing the second kernel.

* * * * *